United States Patent [19]

Purdham

[11] Patent Number: 5,701,313

[45] Date of Patent: Dec. 23, 1997

[54] METHOD AND APPARATUS FOR REMOVING SOFT ERRORS FROM A MEMORY

[75] Inventor: David M. Purdham, Brooklyn Park, Minn.

[73] Assignee: Unisys Corporation, Blue Bell, Pa.

[21] Appl. No.: 394,383

[22] Filed: Feb. 24, 1995

[51] Int. Cl.[6] ............................................ G06F 11/10
[52] U.S. Cl. ............................ 371/40.2; 395/182.04
[58] Field of Search ........................... 371/40.1, 40.2; 395/182.04

[56] References Cited

U.S. PATENT DOCUMENTS

| | | | |
|---|---|---|---|
| 3,761,695 | 9/1973 | Eichelberger | 235/153 |
| 4,056,844 | 11/1977 | Izumi | 364/200 |
| 4,058,851 | 11/1977 | Scheuneman | 364/900 |
| 4,092,713 | 5/1978 | Scheuneman | 364/200 |
| 4,112,502 | 9/1978 | Scheuneman | 364/900 |
| 4,130,865 | 12/1978 | Heart et al. | 364/200 |
| 4,139,148 | 2/1979 | Scheuneman et al. | 235/312 |
| 4,163,147 | 7/1979 | Scheuneman et al. | 235/312 |
| 4,195,770 | 4/1980 | Benton et al. | 371/21 |
| 4,225,958 | 9/1980 | Funatsu | 371/15 |
| 4,298,980 | 11/1981 | Hajdu et al. | 371/25 |
| 4,308,616 | 12/1981 | Timoc | 371/23 |
| 4,349,871 | 9/1982 | Lary | 364/200 |
| 4,369,511 | 1/1983 | Kimura et al. | 371/21 |
| 4,370,746 | 1/1983 | Jones et al. | 371/27 |
| 4,426,681 | 1/1984 | Bacot et al. | 364/200 |
| 4,433,413 | 2/1984 | Fasang | 371/25 |
| 4,442,487 | 4/1984 | Fletcher et al. | 364/200 |
| 4,476,431 | 10/1984 | Blum | 324/73 R |
| 4,493,077 | 1/1985 | Agrawal et al. | 381/25 |
| 4,513,283 | 4/1985 | Leininger | 340/825.02 |
| 4,525,777 | 6/1985 | Webster et al. | 364/200 |
| 4,531,213 | 7/1985 | Scheuneman | 371/3 |
| 4,534,028 | 8/1985 | Trischler | 371/25 |
| 4,535,467 | 8/1985 | Davis et al. | 377/81 |
| 4,546,272 | 10/1985 | Suzuki et al. | 307/455 |
| 4,566,104 | 1/1986 | Bradshaw et al. | 371/15 |
| 4,580,066 | 4/1986 | Berndt | 307/276 |
| 4,595,911 | 6/1986 | Kregness et al. | 340/347 DD |
| 4,608,683 | 8/1986 | Shigaki | 370/13 |
| 4,628,217 | 12/1986 | Berndt | 307/467 |
| 4,649,475 | 3/1987 | Scheuneman | 364/200 |
| 4,667,288 | 5/1987 | Keeley et al. | 364/200 |
| 4,670,876 | 6/1987 | Kirk | 371/3 |
| 4,701,920 | 10/1987 | Resnick et al. | 371/25 |
| 4,755,930 | 7/1988 | Wilson, Jr. et al. | 364/200 |
| 4,757,440 | 7/1988 | Scheuneman | 364/200 |
| 4,782,487 | 11/1988 | Smelser | 371/21 |
| 4,783,785 | 11/1988 | Hanta | 371/25 |
| 4,788,684 | 11/1988 | Kawaguchi et al. | 371/21 |
| 4,794,521 | 12/1988 | Ziegler et al. | 364/200 |
| 4,807,110 | 2/1989 | Pomerene et al. | 364/200 |
| 4,835,774 | 5/1989 | Ooshima et al. | 371/25 |
| 4,843,542 | 6/1989 | Dashiell et al. | 364/200 |
| 4,847,519 | 7/1989 | Wahl et al. | 307/296.2 |
| 4,860,192 | 8/1989 | Sachs et al. | 364/200 |
| 4,876,685 | 10/1989 | Rich | 371/21.6 |
| 4,888,772 | 12/1989 | Tanigawa | 371/21.2 |

(List continued on next page.)

OTHER PUBLICATIONS

IBM Technical Disclosure Bulletin, vol. 18, No. 5, Oct. 1975, pp. 1415–1416.

IBM Technical Disclosure Bulletin, vol. 25, No. 10, Mar. 1983, pp. 5196–5198.

(List continued on next page.)

*Primary Examiner*—Stephen M. Baker
*Attorney, Agent, or Firm*—Nawrocki, Rooney & Sivertson, P.A.

[57] ABSTRACT

A method and apparatus for removing soft errors in a memory element by providing dedicated hardware associated with each memory element which monitors for soft errors as data is read from the memory element. Further, when a soft error is detected, the dedicated hardware may correct the soft error and may further initiate a write operation and over-write the corrupted data word with a corrected data word. This may be accomplished without any intervention by the system.

52 Claims, 8 Drawing Sheets

U.S. PATENT DOCUMENTS

| | | | |
|---|---|---|---|
| 4,903,266 | 2/1990 | Hack | 371/21.2 |
| 4,918,695 | 4/1990 | Scheuneman et al. | 371/51.1 |
| 4,918,696 | 4/1990 | Purdham et al. | 371/57.1 |
| 4,926,426 | 5/1990 | Scheuneman et al. | 371/40.1 |
| 4,962,501 | 10/1990 | Byers et al. | 371/51.1 |
| 4,984,153 | 1/1991 | Kregness et al. | 364/200 |
| 4,992,930 | 2/1991 | Gilfeather et al. | 364/200 |
| 4,996,688 | 2/1991 | Byers et al. | 371/16.5 |
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,058,006 | 10/1991 | Durdan et al. | 364/200 |
| 5,107,501 | 4/1992 | Zorian | 371/213 |
| 5,138,619 | 8/1992 | Fasang et al. | 371/21.1 |
| 5,148,533 | 9/1992 | Joyce et al. | 395/425 |
| 5,155,735 | 10/1992 | Nash et al. | 371/49.1 |
| 5,193,163 | 3/1993 | Sanders et al. | 395/425 |
| 5,195,185 | 3/1993 | Marenin | 395/325 |
| 5,202,966 | 4/1993 | Woodson | 395/325 |
| 5,228,132 | 7/1993 | Neal et al. | 395/425 |
| 5,255,375 | 10/1993 | Crook et al. | 395/325 |
| 5,313,602 | 5/1994 | Nakamura | 395/425 |

OTHER PUBLICATIONS

Electronics, "Level–Sensitive Scan Design Test Chips, Boards, Systems, Neil C. Berglund", vol. 52, No. 6, Mar. 15, 1979, pp. 108–110.

"Hierarchial Cache/Bus Architecture for Shared Memory Multiprocessors", Wilson, Jr., Conference Proceedings IEEE 14th Symposium on Computers, 1987.

"Effects of Cache Coherency in Multiprocessors", Dubois et al., IEEE Trans. on Computers, vol. C–31, No. 11, Nov. 1982.

METHOD AND APPARATUS FOR REMOVING SOFT ERRORS FROM A MEMORY

CROSS REFERENCE TO CO-PENDING APPLICATIONS

The present application is related to co-pending U.S. patent application Ser. No. 08/235,196, filed Apr. 29, 1994, entitled Data Coherency Protocol for Multi-level Cached High Performance Multiprocessor System, and to co-pending U.S. patent application Ser. No. 08/233,811, filed Apr. 26, 1994, entitled Multiple Memory Bit/Chip Failure Detection, and to co-pending U.S. patent application Ser. No. 08/287,880, filed Aug. 9, 1994, entitled Method and Apparatus for Efficiently Interfacing Variable Width Data Streams to a Fixed Width Memory, all assigned to the assignee of the present invention and all incorporated herein by reference.

BACKGROUND OF THE INVENTION

1. Field of the Invention

The present invention is generally related to general purpose, stored program, digital computers and more particularly relates to efficient means for performing memory error detection and correction.

2. Description of the Prior Art

A key design element of high reliability computer systems is that of error detection and correction. It has long been recognized that the integrity of the data bits within the computer system is critical to ensure the accuracy of operations performed in the data processing system. The alteration of one data bit in a data word can dramatically affect arithmetic calculations or can change the meaning of a data word as interpreted by other sub-systems within the computer system.

The cause of an altered data bit may be traced to either a "soft-error" or a "hard error" within a memory element. Soft errors are not permanent in nature and may be caused by alpha particles, electromagnetic radiation, random noise, or other non-destructive event. Soft errors are often referred to as bit-flips indicating that a bit has inadvertently been flipped from a one to a zero or visa versa. Hard errors, on the other hand, are permanent in nature and are often referred to as stuck-at faults. Typically, a hard error may be caused by a manufacturing defect in a memory element or by some other destructive event such as a voltage spike. To eliminate a hard error, a system may mark the address location of the hard error and thereafter avoid using the marked address location.

One method for performing error detection on a memory element is to associate an additional bit, called a "parity bit", along with the binary bits comprising an addressable word. This method involves summing without carry the bits representing a "one" within a data word and providing an additional "parity bit" so that the total number of "ones" across the data word including the added parity bit is either odd or even. The term "even parity" refers to a parity mechanism which provides an even number of ones across the data word including the parity bit. Similarly, the term "odd parity" refers to a parity mechanism which provides an odd number of ones across the data word including the parity bit.

A typical system which uses parity as an error detection mechanism has a parity generation circuit for generating the parity bit. When the system stores a data word into memory, the parity generation circuit generates a parity bit from the data word and the system stores both the data word and the corresponding parity bit into an address location in the memory. When the system reads the address location where the data word is stored, both the data word and the corresponding parity bit are read from the memory. A parity generation circuit then regenerates the parity bit from the data bits read from the memory device and compares the regenerated parity bit with the parity bit that is stored in memory. If the regenerated parity bit and the original parity bit do not compare, an error is detected and the system is notified. It is readily known that a single parity bit in conjunction with a multiple bit data word can detect a single bit error within the data word. It is further known that multiple parity bits in conjunction with a multiple bit data word can detect multiple bit errors within the data word.

Parity generation techniques are also used to perform error correction within a data word. Error correction is typically performed by encoding the data word to provide error correction code bits which are then stored along with the bits of the data word. Upon readout, the data bits read from the addressable memory location are again subject to the generation of the same error correction code signal pattern. The newly generated pattern is compared to the error correction code signals stored in memory. If a difference is detected, it is determined that the data word is erroneous. Depending on the encoding system utilized it is possible to identify and correct the bit position in the data word indicated as being incorrect.

Although the above referenced error correction code algorithms may be used to correct multiple bit errors within a data word, it is advantageous to minimize the number of multiple bit errors within a system. For example, fewer error correction code bits are required to correct a single bit error than a multiple bit error. This translates to less hardware in the system because fewer additional bits are stored with the corresponding data word in a memory element. Further, the error correction code circuitry may be less complex and thus more cost effective. In view of the forgoing, it is evident that it is preferable to have a system where multiple bit errors are minimized.

A typical memory module in prior art systems may consists of a memory element, an error correction code generator, and an error correction code check circuit. Each memory module may service several users including instruction processors, input/output processors, etc. A user may provide a write data word to the memory module for storage. The memory module may then generate an error correction code (ECC) for the write data word. Both the write data word and the error correction code may then be stored in the memory element. Subsequently, a user may request to read the memory location containing the write data word. The memory location may be read and the data word may be provided to the error correction code check circuit. The error correction code check circuit may regenerate the error correction code for the data word and compare the result to the original error correction code. If there is a difference, an error may be indicated to the system by asserting an error signal. By using the original error correction code, the soft errors within the data word may be corrected and the resulting data word may be supplied to the requesting user.

Prior art error correction schemes suffer from a number of inherent limitations. For example, in the configuration described above, before a soft error may be purged from a memory element, the system must respond to the above referenced error signal. That is, the corrupted data word remains in the memory element until the system can take corrective action. This increases the chance that a multiple bit error will be present in the memory element.

This problem is exacerbated in a multi-user system. In a multi-user system, each memory module may service a number of users. The system priority given to each user, and even to the system itself, is governed by an overall priority scheme. For optimal performance and reliability of the computer system, the priority given to a particular user is typically predetermined and difficult to deviate from during normal operation. Therefore, there may be a substantial period of time until the system is granted priority to the memory module to perform correction action thereon. Meanwhile, further soft errors may occur in the memory element thereby causing data words having single bit errors to become data words having multiple bit errors. Further, other users may continue to access the corrupted data word from the memory element.

Another limitation of prior art error correction schemes is that system resources must be diverted to monitor and correct soft errors within the system. That is, once the system gains priority of a corrupted memory element, various elements within the system must be interrupted to service the corrupted memory element. For example, instruction processors, internal bus elements, and even other memory elements may be required to service the corrupted memory element. This may detract from optimal system efficiency and performance. As stated above, these are undesirable limitations of prior art error correction schemes.

SUMMARY OF THE INVENTION

The present invention overcomes the limitations found in the prior art by providing a method and apparatus for removing soft errors in a memory element by providing dedicated hardware associated with each memory element which monitors for soft errors as data is read from the memory element. Further, when a soft error is detected, the dedicated hardware may correct the soft error by initiating a write operation and over-writing the corrupted data word with a corrected data word. All of this may be accomplished without any intervention by the system.

The dedicated hardware may be programmed with a priority which is independent from the priority scheme used in the rest of the system. When priority is granted to the dedicated hardware, normal memory functions may be interrupted and the corrupted data word may be over-written with a corrected data word. All of this may be accomplished independent of the rest of the system. That is, the present invention may remove soft errors from a memory element as the soft errors are encountered, without any intervention from the system.

In one embodiment of the present invention, each memory module may consists of a memory element, a write data stack, a multiplexer, an error correction code block, and an error control block. The write data stack may provide write data words to the memory element through a multiplexer. During normal write operation, the multiplexer may be set to select the write data words provided by the write data stack. During normal read operation, a read data word may be read from the memory element and provided to the error correction code block. The error correction code block may detect soft errors in the read data word. A corrected read data block may perform error correction on any corrupted read data words. The corrected read data word may then be provided to a requesting user. It is recognized that the error correction code block may detect both single and multiple bit errors. It is further recognized that the corrected read data block may correct both single and multiple bit errors.

Unlike prior art systems, the present invention may provide the corrected read data word, along with the corresponding address, to an error control block. The error control block may control the operation of the memory element, the multiplexer and the write data stack. The error control block further provides the corrected read data word and the corresponding address to the multiplexer. During an appropriate time determined by the priority scheme, the error control block may disable the write data stack, force the multiplexer to select the corrected read data word and the corresponding address, and force the memory element to a write mode, thereby writing the corrected read data word over the corrupted data word.

The error control block may be programmed with a priority scheme which is independent from the system priority scheme. Therefore, the thing of when the error control block interrupts normal memory functions, and forces a write of the corrected read data word over the corrupted data word, may be controlled by the error control block priority scheme. In a preferred embodiment, the error control block is given the highest priority thereby allowing the error control block to over write the corrupted data word as soon as practicable. This minimizes the chance that a single bit error will become a multiple bit error.

In another embodiment of the present invention, each memory word may be partitioned into a number of data words. A memory word may be defined as the data packet that is actually stored in a memory location. Each of the memory words may comprise a number of data words. This architecture may be used to optimize system performance.

It is known that memory elements may operate at a lower clock rate than the surrounding circuitry. Therefore, it may be advantageous to concatenate two or more data words provided by the surrounding circuitry into one memory word thereby allowing the memory device to operate at a lower clock rate than the surrounding circuitry. This may increase the effective band width of the system. This algorithm is discussed further in co-pending U.S. patent application Ser. No. 08/287,880, filed Aug. 9, 1994, entitled Method and Apparatus for Efficiently Interfacing Variable Width Data Streams to a Fixed Width Memory, which is incorporated herein by reference.

In accordance with the above referenced embodiment, an error correction code may be generated for each data word. The error correction code for each data word may be stored in the corresponding memory word. Partitioning in this manner may increase the chance that only a single bit error will occur in a particular data word. That is, a memory word may have multiple bit errors therein, but each of the errors may be positioned in a different data word. The partitioning algorithm discussed above may be in accordance with co-pending U.S. patent application Ser. No. 08/233,811, entitled Multiple Memory Bit/Chip Failure Detection, which is expressly incorporated herein by reference.

In accordance with the above discussion, an error correction code may be generated for each data word of a corresponding memory word before the memory word is written into the memory element. After the error correction codes are generated, the resulting memory word may then be stored in the memory element. Similarly, after a memory word is read from the memory element, the corresponding error correction code for each data word may be checked to determine if any errors have occurred therein. If an error is detected, an error correction block corrects the data word and sends the result to a requesting user. Further, the corrected data is provided to a staging register.

Because each of the data words of a corresponding memory word are handled separately and sequentially, a number of subsequent read operations of the memory element may occur before an error is detected and the normal operation of the memory element can be interrupted. It is recognized that soft errors may also occur in the data words corresponding to these subsequent read operations. To ensure that the corrected data for all read operations is available to be written over the corresponding corrupted data in the memory element, a number of staging registers may be provided. The staging registers provide a means for storing the corrected data for the current read operation and all subsequent read operations which occur before the normal memory operation of the memory element can be interrupted by the error control block. Once the normal memory operation of the memory element is interrupted, the corrected data contained in the staging registers may be written into a corresponding memory location within the memory element.

The error control block may be programmed to avoid writing the corrected data to memory locations that have been updated during normal memory operation. For example, if a user writes a memory word to a location where an error has been previously encountered but not yet corrected, the error correction block may be programmed to not over-write the newly written memory word. The above referenced protocol may ensure that the newly written memory word is not disturbed by over-writing of an older memory word.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
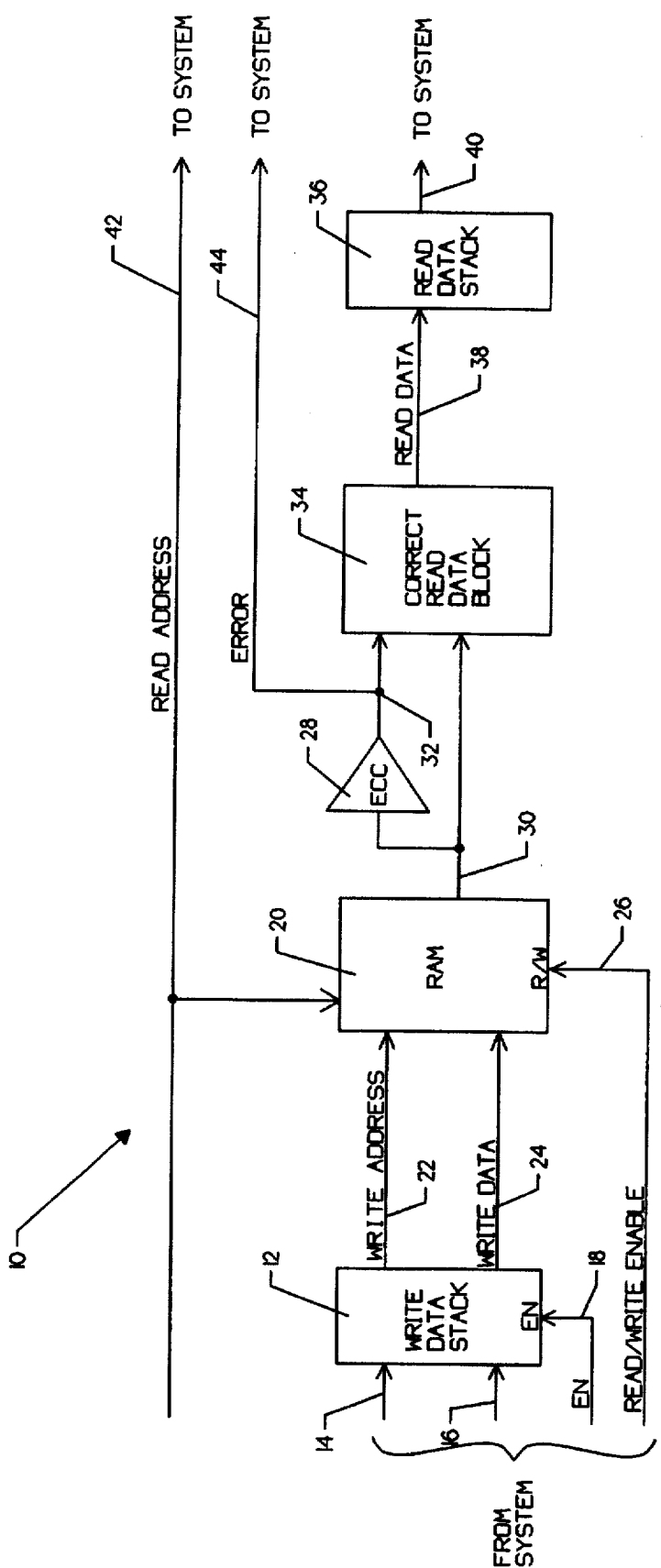
FIG. 1 is a block diagram of a prior art error correction scheme coupled to a memory module.

FIG. 1 is a block diagram of a prior art error correction scheme coupled to a memory module. The block diagram is generally shown at 10. The memory module may be utilized and controlled by a system (not shown).

A write data stack 12 is provided for storing a number of data elements. Each data element may have a data word and a corresponding address associated therewith. The system may provide the data words and the corresponding addresses to write data stack 12 via interfaces 16 and 14, respectively. The system may further control write data stack 12 via an enable line 18. Write data stack 12 essentially provides a buffer between the system (not shown) and the memory module.

Write data stack 12 is coupled to random access memory (RAM) 20 via interfaces 22 and 24. Write data stack 12 provides a write data word to RAM 20 via interface 24 and a corresponding write address to RAM 20 via interface 22. The system may control whether RAM 20 is in a read mode or a write mode via interface 26. It is recognized that the data elements provided to RAM 20 may already have an error correction code attached thereto. That is, the system may generate an error correction code for each data word prior to supplying the data word to write data stack 12.

During normal memory write operation, the system may provide a number of data elements having a number of corresponding error correction codes to write data stack 12. The system may then place RAM 20 into a write mode via interface 26, wherein a predetermined number of data element in write data stack 12 may be sequentially stored in RAM 20. It is recognized that write data stack 12 may operate in a FIFO or LIFO mode.

RAM 20 is coupled to error correction code block 28 via interface 30. Error correction code block 28 regenerates an error correction code for each data word read from RAM 20. The error correction code generated by error correction code block 28 is provided to a correct read data block 34 via interface 32. Each of the corresponding data elements read from RAM 20 is also provided to correct read data block 34 via interface 30. Correct read data block 34 may correct a corrupted read data word and provide the result to read data stack 36 via interface 38. Read data stack 36 is similar to write data stack 12 and may provide a buffer between correct read data block 34 and the system (not shown). Read data stack 36 may provide the data words to the system via interface 40. During normal read operation, the system places RAM 20 in a read mode via interface 26. The system also supplies a read address to RAM 20 via interface 42. The addressed data word is read from RAM 20 and provided to error correction code block 28 via interface 30. Error correction code block 28 regenerates an error correction code for the addressed data word and provides the result to correct read data block 34 via interface 32. The addressed data word is also directly provided to correct read data block 34 via interface 30.

Correct read data block 34 compares the error correction code regenerated by error correction code block 28 with the error correction code that was stored with the corresponding data word in RAM 20. If there is a match, the data word read from RAM 20 is passed directly to read data stack 36 via interface 38. If a difference is detected between the error correction code regenerated by error correction block 28 and the error correction code stored with the corresponding data word, correct read data block 34 corrects the data element using standard error correction techniques. An indication of the error and the corresponding address location are provided to the system via interfaces 44 and 42, respectively.

This configuration suffers from a number of inherent limitations. For example, in the configuration shown in FIG. 1, before a soft error may be purged from RAM 20, the system must respond to the above referenced error signal 44. That is, the corrupted data word remains in RAM 20 until the system can take corrective action. This increases the chance that a multiple bit error will be present in RAM 20.

This problem is exacerbated in a multi-user system. In a multi-user system, each memory module 10 may service a number of users. The system priority given to each user, and even to the system itself, is governed by an overall priority scheme. For optimal performance and reliability of the computer system, the priority given to a particular user is typically predetermined and difficult to deviate from during normal operation. Therefore, there may be a substantial period of time before the system is granted priority to memory module 10 to perform correction action thereon. Meanwhile, further soft errors may be occurring in RAM 20 thereby causing data words having single bit errors to become data words having multiple bit errors. Further, other users may continue to access the corrupted data word from the memory element. Another limitation with prior art error correction schemes is that system resources must be diverted to monitor and correct soft errors within the system. That is, once the system gains priority of a corrupted memory module 10, various elements within the system must be interrupted to service the corrupted memory element. For example, instruction processors, internal bus elements, and even other memory elements may be required to service the corrupted memory module 10. This may detract from optimal system efficiency and performance. As stated above, these are undesirable limitations of prior art error correction schemes.

Figure 2:
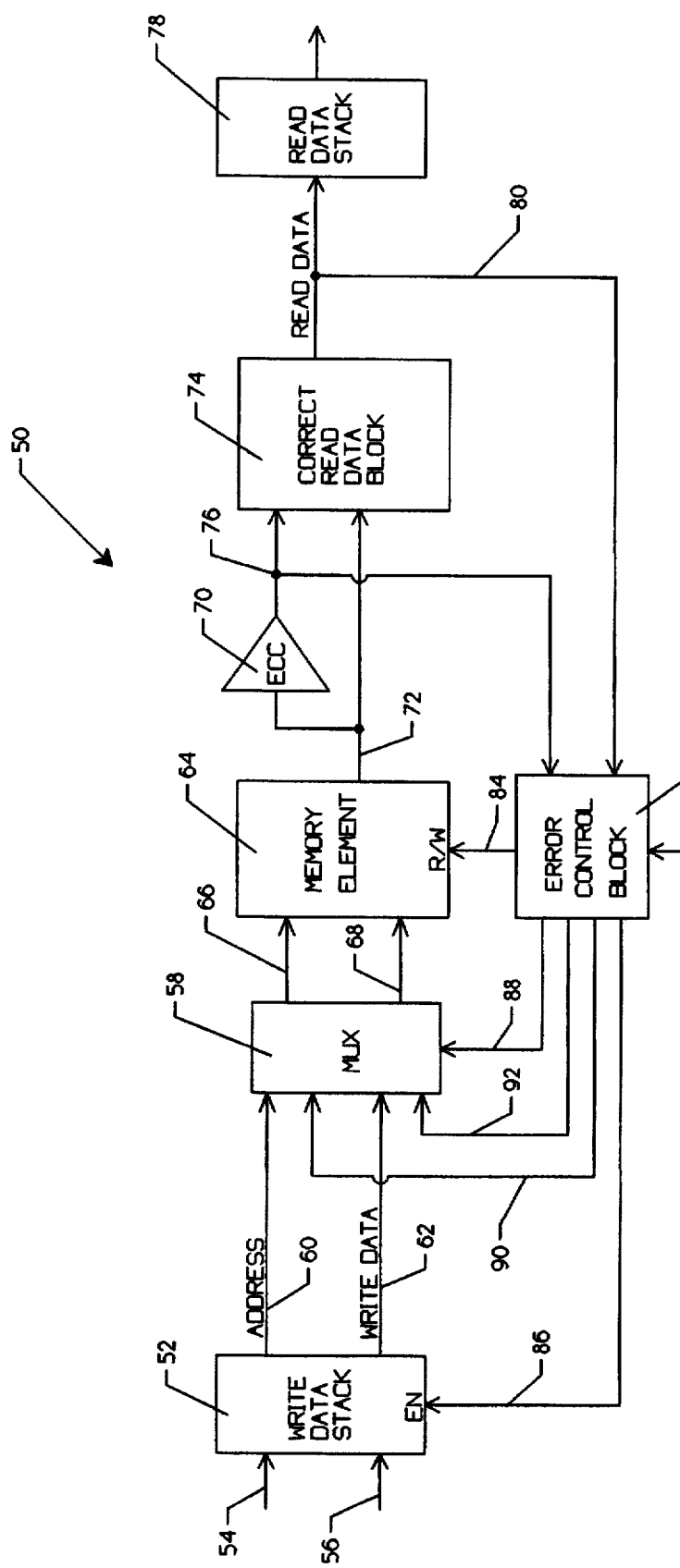
FIG. 2 is a block diagram of a first embodiment of the present invention.

FIG. 2 is a block diagram of a first embodiment of the present invention. The block diagram is generally shown at 50. The present embodiment provides a means for removing soft errors in a memory element 64 by providing dedicated hardware associated with each memory element 64 which monitors for soft errors as data is read therefrom. Further, when a soft error is detected, the dedicated hardware may correct the soft error by initiating a write operation and over-writing the corrupted data word with a corrected data word. All of this may be accomplished without any system intervention.

The dedicated hardware may be programmed with a priority which is independent from the priority scheme used in the rest of the system. When priority is granted to the dedicated hardware, normal memory functions may be interrupted and the corrupted data word may be over-written with a corrected data word. All of this may be accomplished independent of the rest of the system. That is, the present embodiment may remove soft errors from memory element 64 as the soft errors are encountered, without any intervention by the system.

In the embodiment shown in FIG. 2, each memory module may consists of a memory element 64, a write data stack 52, a multiplexer 58, an error correction code block 70, an error control block 82, and a correct read data block 74. Write data stack 52 is provided for receiving data words and corresponding address elements from various users. The various users (not shown) may include instruction processors, input/output processors, other memory modules, etc. Write data stack 52 provides a buffer function between the various users and the present memory module 50. Write data stack 52 may be constructed in accordance with any buffering algorithm including the FIFO and LIFO algorithms.

Various users may provide data words and corresponding addresses to write data stack 52 via interfaces 54 and 56, respectively. In the embodiment shown in FIG. 2, it is assumed that the users generate an error correction code for each data word prior to transmitting the data word and the corresponding error correction code to memory module 50.

Write data stack 52 may provide write data words to memory element 64 through a multiplexer 58. During normal write operation, multiplexer 58 is set to select the write data words provided by write data stack 52. That is, a write data word is provided by write data stack 52 to a multiplexer 58 via interface 62, which is then transmitted to memory element 64. Further, write data stack 52 provides a corresponding address to multiplexer 58 via interface 60. Multiplexer 58 selects the write data word and the corresponding address and provides them to a memory element 64 via interfaces 68 and 66, respectively. It is recognized that memory element 64 may comprise a single memory device or multiple memory devices as shown in co-pending U.S. patent application Ser. No. 08/233,811, entitled Multiple Memory Bit/Chip Failure Detection, which has been incorporated herein by reference. Memory element 64 writes the write data word, along with the associated error correction code, into a corresponding address location within memory element 64.

During normal memory read operation, a read data word may be read from memory element 64 and provided to an error correction code block 70 via interface 72. Error correction code block 70 may regenerate the error correction code for the corresponding read data word and provide the result to correct read data block 74 via interface 76. Error correction code block 70 may further provide the error correction code to an error control block 82. The read data word, along with the previously generated error correction code read from memory element 64, may also be supplied to correct read data block 74 via interface 72. Correct read data block 74, inter alia, compares the error correction code regenerated by error correction code block 70 and the original error correction code that was previously generated and stored with the corresponding data word in memory element 64. If there is a match, the read data word may be passed directly to read data stack 78 via interface 80. If there is a discrepancy, the read data word may be corrected using standard error correction techniques and then provided to read data stack 78. The corrected data word may then be provided to a requesting user (not shown). It is recognized that error correction code block 70 may detect and correct both single and multiple bit errors.

Unlike prior art systems, the present embodiment may provide the corrected read data word, along with the corresponding address (not shown), to error control block 82. Error control block 82 may control memory element 64, multiplexer 58 and write data stack 52. Error control block 82 may further provide the corrected read data word and the corresponding address to multiplexer 58.

Pursuant to a predetermined priority scheme, error control block 82 may disable write data stack 52, force multiplexer 58 to select the corrected read data word and the corresponding address, and force memory element 64 to a write mode, thereby writing the corrected read data word over the corrupted data word.

As stated above, error control block 82 may be programmed with a predetermined priority scheme. The predetermined priority scheme of error control block 82 may be independent from the priority scheme used by the rest of the system. The predetermined priority scheme utilized by error control block 82 determines when error control block 82 interrupts normal memory functions and forces a write of the corrected read data word over the corrupted data word. In a preferred embodiment, error control block 82 is given the highest priority thereby allowing error control block 82 to over-write a corrupted data word as soon as practicable. As stated above, this may minimize the chance that further soft errors may occur in the corresponding data word and thus may reduce the chance that a multiple bit error will result.

Further, this may reduce the chance that other users will access the corrupted data.

Figure 3:
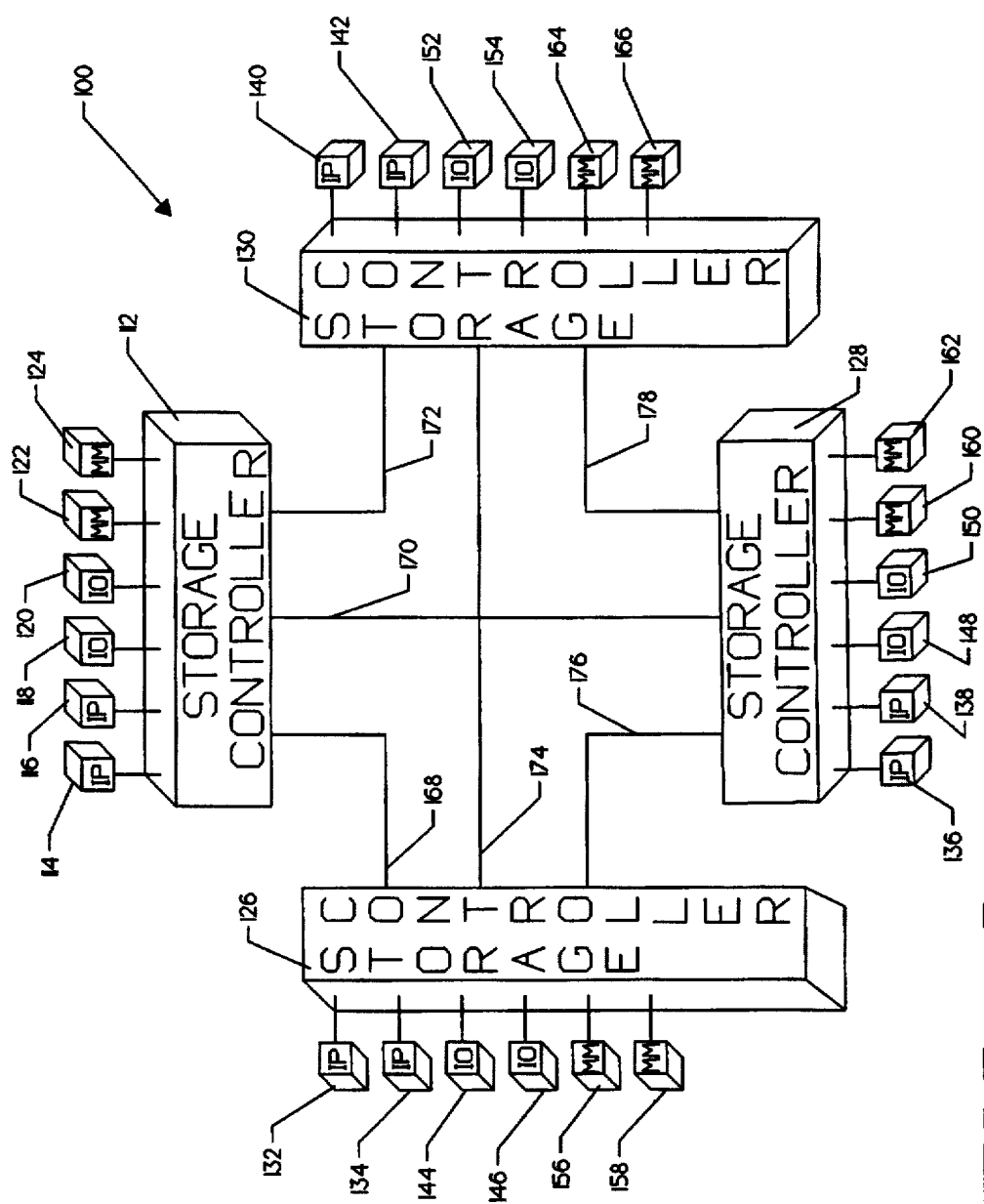
FIG. 3 is an overall block diagram of a multi-user system utilizing the preferred embodiment of the present invention.

FIG. 3 is an overall block diagram of a multi-user system utilizing a preferred embodiment of the present invention. Data processing system 100 includes four individual processing clusters, each having its own storage controller and each having point-to-point communication with the other clusters via a storage controller to storage controller interface.

Storage controller 112 is coupled to storage controller 126 via interface 168. Similarly, storage controller 112 is coupled to storage controller 128 via interface 170 and to storage controller 130 via interface 172. Storage controller 126 communicates with storage controller 128 via interface 176 and to storage controller 130 via interface 174. In similar fashion, storage controller 128 and storage controller 130 are coupled via interface 178.

Storage controller 112 is fully populated with instruction processor 114, instruction processor 116, input/output processor 118, input/output processor 120, main memory module 122 and main memory module 124. Each of instruction processors 114 and 116 (along with similar instruction processors 132, 134, 136, 138, 140, and 142) has internal dedicated cache resources in the form of an instruction cache and an operand cache (see FIG. 4). These elements, along with the associated data invalidity logic, are described in more detail below.

Input/output processors 118, 120, 144, 146, 148, 150, 152, and 154 may be elements currently available, such as found in the Unisys Model 2200/600 series.

Figure 4:
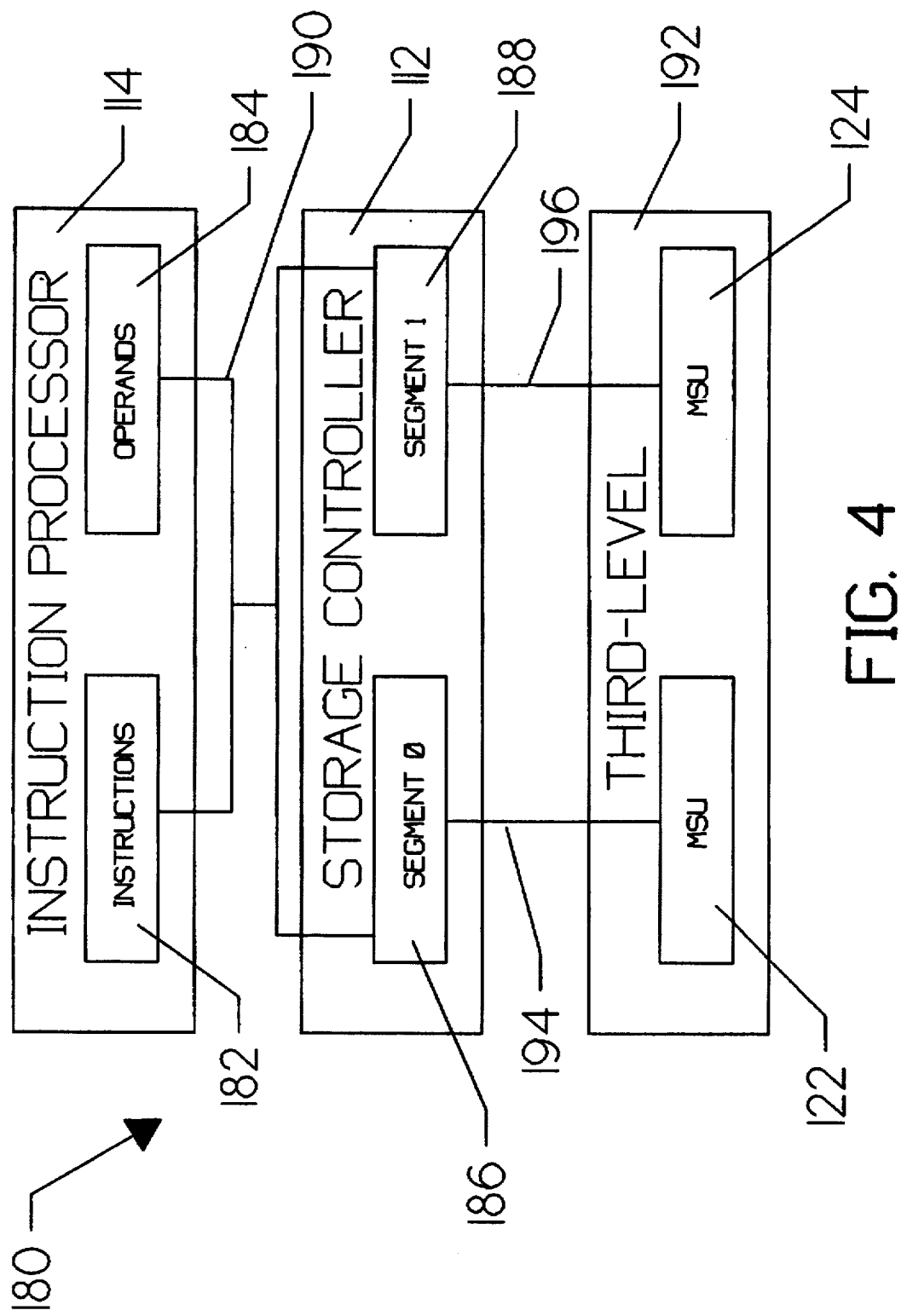
FIG. 4 is a schematic flow diagram of the memory hierarchy of the system shown in FIG. 3.

FIG. 4 is a schematic flow diagram of the memory hierarchy of the system shown in FIG. 3. Instruction processor 114 contains an instruction cache 182 and an operand cache 184, each storing 8K of 36 bit words. These are internal to instruction processor 114 and dedicated to the operations undertaken therein. By partitioning the internal dedicated cache resources in this manner, there is a certain concurrency of cache accesses associated with normal instruction execution.

Upon the request of instruction processor 114 to access a particular data element as either an instruction or operand, the directory of instruction cache 182 or operand cache 184, respectively, is queried to determine if the required data element is present within the associated cache resource. If the data element is present and valid, the access is completed at that level. If not, access is made to storage controller 112 via interface 190 for the block of eight 36 bit words containing the desired data element. A more detailed explanation of the operation of instruction cache 182 and operand cache 184 is found below.

Storage controller 112 contains an intermediate level cache segment of 128K 36 bit words for each for each main memory module within the cluster. In the present illustration, storage controller 112 contains segment-0 cache 186 and segment-1 cache 188. These cache resources are shared by all users of the main memory within the cluster to include both local and remote users. Any memory request to storage controller 112 is routed to the appropriate directory of segment-0 cache 186 or segment-1 cache 188 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment-0 186 or segment-1 188 (depending- upon the requested address), the data is requested from third level storage 192 containing main memory modules 122 and 124 via interfaces 194 and 196, respectively. In the preferred mode, main memory modules 122 and 124 each contain 64 MEG words of storage.

Each data element request to storage controller 112 is made through a separate interface. For a fully populated system, this includes two instruction processors, two input/output processors, and three other storage controllers (see also FIG. 3). Each data element request is divided between segment-0 cache 186 and segment-1 cache 188 based upon requested address. Only if the requested data element is not validly present in the appropriate intermediate level cache resource is an access request made to third level 192.

Figure 5:
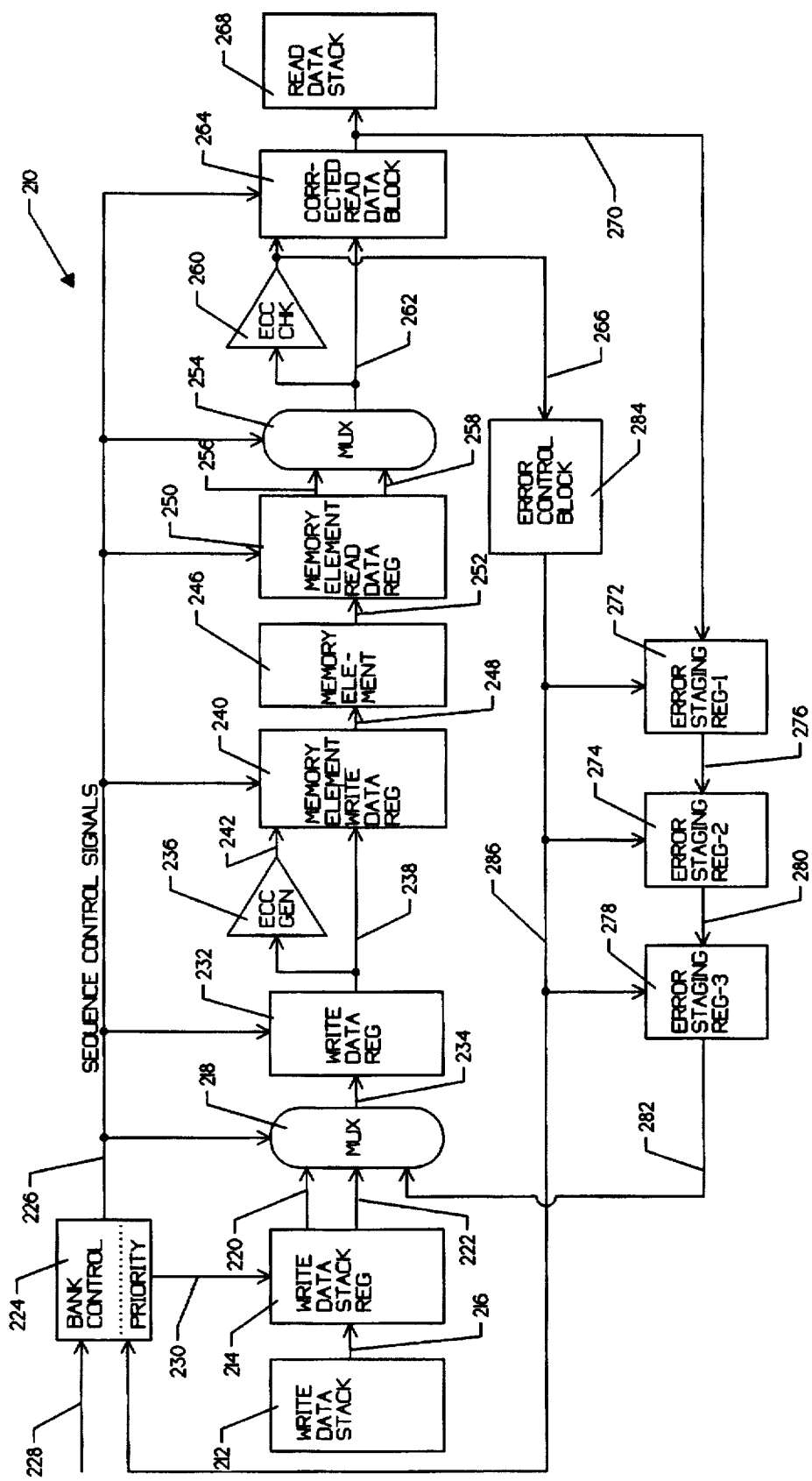
FIG. 5 is a block diagram of a preferred embodiment of the present invention.

FIG. 5 is a block diagram of a preferred embodiment of the present invention. The block diagram is generally shown at 210 and represents one memory bank within the system described in FIGS. 3–4. It is recognized that the this memory bank may be used for any memory element within the system including the instruction cache 182, the operand cache 184, the segment-0 cache 186, the segment-1 cache 188, the main storage unit 122, and/or the main storage element 124. That is, the memory bank shown generally at 210 is universal and may be used throughout a system.

In accordance with the embodiment shown in FIG. 5, each memory word may be partitioned into a number of data words. It is known that memory elements may operate at a lower clock rate than the surrounding circuitry. Therefore, it may be advantageous to concatenate two or more data words provided by the surrounding circuitry into one memory word thereby allowing the memory device to operate at a lower clock rate than the surrounding circuitry. A further discussion of the concatenation algorithm used in the preferred embodiment may be found in co-pending U.S. patent application Ser. No. 08/287,880, filed Aug. 9, 1994, entitled Method and Apparatus for Efficiently Interfacing Variable Width Data Streams to a Fixed Width Memory, which is incorporated herein by reference.

An error correction code may be generated for each data word and stored along with the corresponding memory word. Partitioning in this manner may increase the chance that only a single bit error will occur in a particular data word. That is, a memory word may have multiple bit errors but each of the multiple errors may fall within a different data word. By partitioning the memory word in this manner, there is a greater chance that only single bit errors will result in each data word. As stated above, it is preferable to minimize the number of multiple bit errors within a computer system.

Referring to FIG. 5, each memory bank may comprises a memory element 246, a write data stack 212, a write data stack register 214, a first multiplexer 218, a write data register 232, an error correction code generation block 236, an error control block 284, a memory element write data register 240, a memory element read data register 250, a second multiplexer 254, an error correction code check circuit 260, a bank control block 224, and a number of staging registers 272, 274, and 278.

Write data stack 212 may be provided for receiving data words and corresponding address elements from various users. The various users (not shown) may include instruction processors, input/output processors, other memory modules, etc. (see FIG. 3). Write data stack 212 may provide a buffer function between the various users and the present memory module. Write data stack 212 may be constructed in accordance with any buffering algorithm, including the FIFO and LIFO algorithms. The various users of the memory module may provide data words and corresponding addresses to write data stack 212.

During normal memory write operation, write data stack 212 may provide a memory word to write data stack register 214. Multiplexer 218 may then sequentially select each individual data word from the memory word and provide the result to write data register 232 via interface 234. Write data register 232 may then provide the individual data words to error correction code generation block 236 via interface 238 wherein a corresponding error correction code may be generated therefor. The resulting data word and corresponding error correction code may then be provided to memory element write data register 240 via interfaces 238 and 242, respectively. After all of the data words of the corresponding memory word have been processed in this manner and stored in memory element write data register 240, the resulting memory word may be written to memory element 246 via interface 248.

It is contemplated that memory element 246 may comprise one or more memory devices including one or more DRAM devices. It is further contemplated that predetermined portions of the bits of a particular memory word may be stored in different memory devices comprising memory element 246. This configuration further increases the reliability of the computer system and is described in co-pending U.S. patent application Ser. No. 08/233,811, entitled Multiple Memory Bit/Chip Failure, which is expressly incorporated herein by reference.

During normal memory read operation, a memory word is read from memory element 246 and provided to memory element read data register 250 via interface 252. Memory element read data register 250 is coupled to multiplexer 254 via interfaces 256 and 258. Multiplexer 254 may sequentially select each individual data word from the memory word stored in memory element read data register 250 and provide the result to the error correction code check circuit 260 and to corrected read data block 264 via interface 262. Error correction code check circuit 260 may regenerate a corresponding error correction code for each data word. The resulting read data word and the corresponding regenerated error correction code may then be provided to corrected read data block 264 via interfaces 262 and 266, respectively. Corrected read data block 264, inter alia, compares the error correction code regenerated by error correction code check circuit 260 and the original error correction code that was previously generated and stored with the corresponding data word in memory element 246. If there is a match, the read data word may be passed directly to read data stack 268 via interface 270. If there is a discrepancy, the read data word may be corrected using standard error correction techniques and then provided to read data stack 268 via interface 270. It is recognized that error correction code check circuit 260 may detect both single and multiple bit errors. It is further recognized that corrected read data block 264 may correct both single and multiple bit errors.

Error control block 284 is coupled to error correction code check circuit 260 via interface 266. Error control block 284 notifies bank controller 224 that an error has occurred via interface 286. Bank controller 224 controls the operation of the memory module via a number of sequence control signals on interface 226.

An error staging register-1 272 is coupled to corrected read data block 264 via interface 270. Error staging register-1 272 is coupled to an error staging register-2 274 via interface 276. Error staging register-2 274 is coupled to an error staging register-3 278 via interface 280. Error staging register-3 278 is coupled to multiplexer 218 via interface 282. Error staging registers 272, 274 and 278 are controlled by error control block 284 via interface 286.

Because each of the data words of a corresponding memory word are handled separately and sequentially, a number of subsequent read operations of memory element 246 may occur before an error is detected by error correction code check circuit 260 and provided to error control block 284 and bank controller 224. It is recognized that soft errors may be present in the data words corresponding to these subsequent read operations. To ensure that the corrected data for all of the read operations are available to be written over the corresponding corrupted data in memory element 246, the above referenced staging registers 272, 274, and 278 may be provided. Staging registers 272, 274, and 278 provide a means for storing the corrected data for the current read operation and the subsequent read operations which occur before the normal memory operation of memory element 246 can be interrupted by the bank controller 224. Once the normal memory operation of the memory element is interrupted, the corrected data contained in staging registers 272, 274, and 278 may be written into the corresponding memory location within memory element 246.

It is recognized that bank controller 224 may be programmed to avoid writing the corrected data to memory locations that have been updated during normal memory operation. For example, if a user writes a memory word to a location where an error has been previously encountered but not yet corrected, bank controller 224 may be programmed to not over-write the newly written memory word. The above referenced protocol may ensure that the newly written memory word is not disturbed by over-writing of an older memory word.

Bank controller 224 may further be programmed with a predetermined priority scheme. The predetermined priority scheme may be independent from the priority scheme used by the system. The predetermined priority scheme utilized by bank controller 224 may determine when bank controller 224 interrupts normal memory operation and forces a write of the corrected read data word over the corrupted data word. In a preferred embodiment, bank controller 224 is given the highest priority thereby allowing bank controller 224 to over-write a corrupted data word as soon as practicable. As stated above, this may minimize the chance that further soft errors may occur in the corresponding data word and thus reduces the chance that a multiple bit error will result. Further, this reduces that chance that other users will access the corrupted data.

Figure 6:
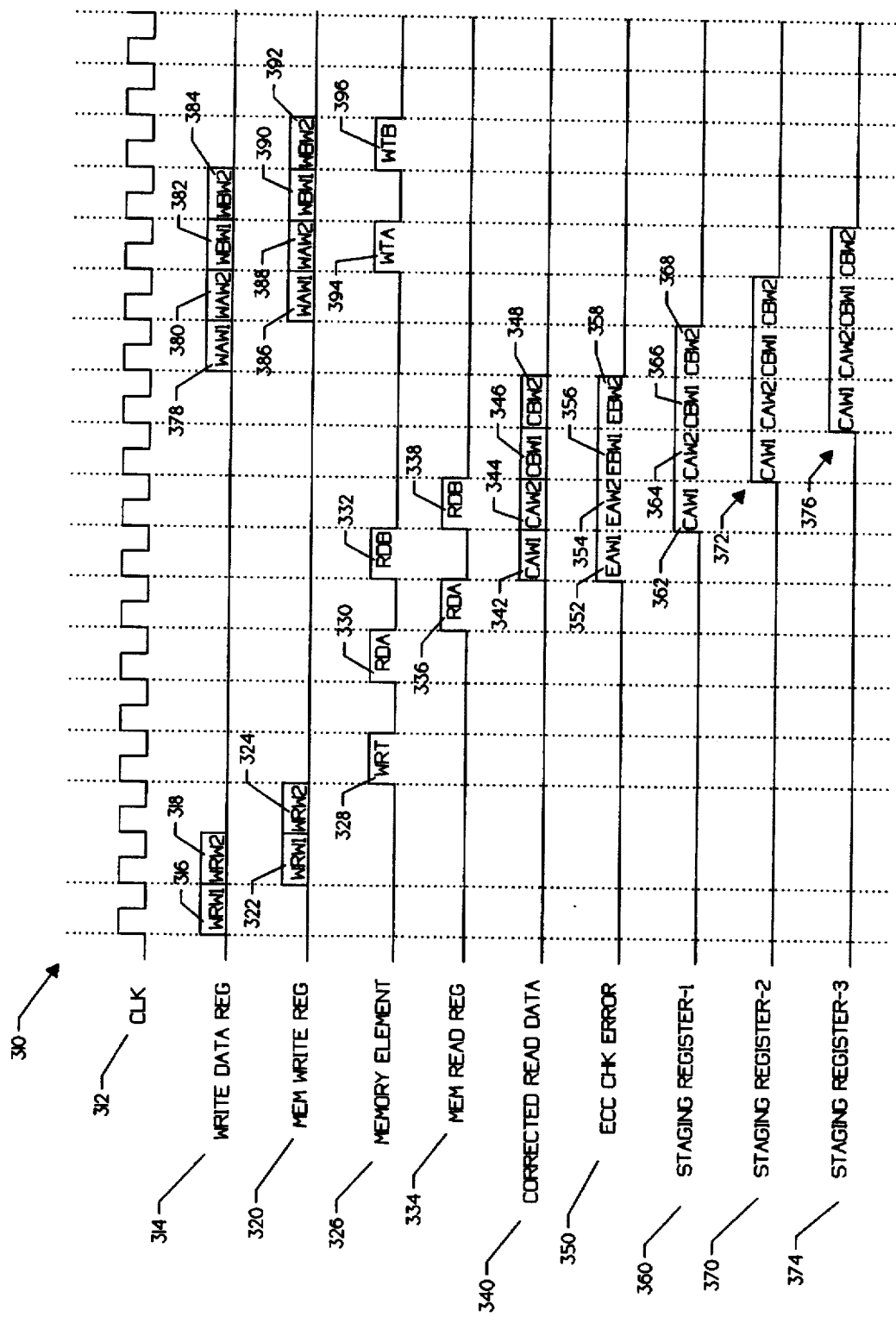
FIG. 6 is a timing diagram illustrating the operation of the preferred embodiment of the present invention as shown in FIG. 5.

FIG. 6 is a timing diagram illustrating the operation of the preferred embodiment of the present invention shown in FIG. 5. The timing diagram is generally shown at 310. A reference clock is shown at 312 wherein it is contemplated that all circuitry, except memory element 246, may be driven by clock 312. As discussed above, in the preferred embodiment two data words are concatenated to form a single memory word. In this configuration, memory element 246 may operate at one-half the clock rate of the surrounding circuitry. This is shown by trace 326 wherein the write and read operations of memory element 246 may occur every other clock cycle of reference clock 312.

Referring back to FIG. 5, write data stack 212 provides a buffer between the various users and the memory module, thereby storing a plurality of memory words therein. A first of a plurality of memory words may be transferred to write data stack register 214 via interface 216. Further, each memory word is partitioned into a number of data words wherein a correction code is generated for each data word and stored therewith. In the present embodiment, each memory word may comprise two data words. A first of the two data words stored in write data stack register 214 may be selected by multiplexer 218 via interface 220 and provided to write data register 232 via interface 234.

The operation of write data register 232 is shown at 314 in FIG. 6. The transfer of the first data word from write data stack register 214 to write data register 232 is shown at 316. On the next clock cycle, the first data word stored in write data register 232 is provided to error code correction generation block 236 via interface 238, and further to memory element write data register 240 via interface 238. Error correction code generation block 236 generates the error correction code for the first data word and provides the result to memory element write data register 240 via interface 242. The transfer of the first data word from write data register 232 to memory element write data register 240 is shown at 322.

At the same time that the first data word is transferred from write data register 232 to memory element write data register 240, the second data word stored in write data stack register 214 is selected by multiplexer 218 and provided to write data register 232 via interface 234. This transfer is shown at 318. On the next clock cycle, the second data word stored in write data register 232 is provided to error correction code generation block 236 via interface 238 and further is provided to memory element write data register 240 via interface 238. Error correction code generation block 236 generates the error correction code for the second data word and provides the result to memory element write data register 240 via interface 242. The transfer of the second data word from write data register 232 to memory element write data register 240 is shown at 324.

The operation of memory element 246 of FIG. 5, is shown at 326 of FIG. 6. In the exemplary timing diagram, memory element 246 may be placed in a write mode as shown at 328, thereby storing the first and second data words into a corresponding memory location. To illustrate the function of the preferred embodiment, it is assumed that memory element 246 is placed in a read mode for at least two subsequent memory cycles as shown at 330 and 332. That is, a first memory word may be read from memory element 246 as shown at 330 and provided to memory element read data register 250 via interface 252 as shown at 336. Further, a second memory word may be read from memory element 246 and provided to memory element read data register 250 via interface 252 as shown at 338.

As stated above, the memory word comprises two data words. Multiplexer 254 selects the first of the two data words stored in memory element read data register 250 and provides the result to error correction code check circuit 260 and further to corrected read data block 264 via interface 262. Error correction code check circuit 260 regenerates the error correction code for the first data word and provides the result to corrected read data block 264 via interface 266. If the error correction code generated by error correction code generation block 236 matches the error correction code regenerated by error correction code check circuit 260, the data word may not contain any soft errors and may be passed directly to read data stack 268 via interface 270.

Conversely, if there is a discrepancy between the above referenced error correction codes, corrected read data block 264 corrects the first data word using standard error correction techniques. The result is then provided to read data stack 268 via interface 270. On the following clock cycle, the second data word stored in memory element read data register 250 is selected by multiplexer 254 and provided to error correction code check circuit 260 and further to corrected read data block 264 via interface 262.

As a result of the first memory read operation 330, the arrival and correction of the first and second data words in corrected read data block 264 is shown at 342 and 344, respectively. Similarly, as a result of the second memory read operation 332, the arrival and correction of the first and second data words in corrected read data block 264 is shown at 346 and 348, respectively.

In the exemplary timing diagram, it is assumed that the first and second data words in the first memory word and the first and second data words in the second memory word each have a soft error therein. Error correction code check circuit 260 provides an error signal for each data word having an error therein as shown at 352, 354, 356, and 358, respectively. In the present embodiment, the first error signal 352 provided by error correction code check circuit 260 occurs during the same clock cycle as the second read operation 332. That is, bank controller 224 is not notified and thus cannot remove the memory from normal memory operation until the second read operation 332 is already underway. Since each read operation produces two data words, there are four data words which must be stored and later rewritten over the corresponding corrupted memory locations of memory element 246. The three error staging registers 272, 274, and 278 are provided in the embodiment shown in FIG. 5 for storing these corrected data words until they can be rewritten over the corresponding corrupted memory locations of memory element 246.

Each of the above referenced four data words is passed sequentially from corrected read data block 264 to error staging register-1 272. That is, after each of the four data words is processed by corrected error read data block 264, the corresponding data word is provided to error staging register-1 272. The operation of error staging register-1 272 is shown at 360 wherein each of the above referenced four data words are passed sequentially to error staging register-1 272 as shown at 362, 364, 366, and 368, respectively.

Error staging register-1 272 is coupled to error staging register-2 274 via interface 276. Each of the above referenced four data words is transferred from error staging register-1 272 to error staging register-2 274 during each subsequent clock cycle. The operation of error staging register-2 272 is shown at 370 wherein each of the above referenced four data words are passed sequentially to error staging register-2 274 as shown generally at 372.

Error staging register-2 274 is coupled to error staging register-3 278 via interface 280. Each of the above referenced four data words is transferred from error staging register-2 274 to error staging register-3 278 during each subsequent clock cycle. The operation of error staging register-3 278 is shown at 374 wherein each of the above referenced four data words are passed sequentially to error staging register-3 278 as shown generally at 376.

Once the first of the above referenced four data words reaches error staging register-3 278 as shown at 376, bank controller 224 terminates normal memory operation and forces multiplexer 218 to select the output of error staging register-3 278. On the next clock cycle, bank controller 224 enables write data register 232 to store the first of the above referenced four data words as shown at 378. During the same clock cycle that write data register 232 stores the first of the above referenced four data words as shown at 378, the last of the above referenced four data words is stored in error staging register-1 272 as shown as 368. Because the timing is such that the first of the above referenced four data words is stored in write data register 232 while the last of the four above referenced data words is stored in error staging register-1 272, only three error staging registers are required.

In accordance with the above discussion, the second though fourth of the above referenced four data words are similarly selected by multiplexer 218 and provided to write data register 232 as shown at 380, 382, and 384, respectively. Write data register 232 sequentially provides each of the four above referenced data words to error correction generation block 236 and to memory element write data register 240 as shown at 386, 388, 390, and 392, respectively. Error correction generation block 236 generates an error correction code for each of the four data words. Once the first and second data words of the above referenced four data words arrive at memory element write data register 240 thereby forming a first memory word, the corresponding memory word may be written to memory element 246 as shown at 394. Similarly, once the third and fourth data words of the above referenced four data words arrive at memory element write data register 240 thereby forming a second memory word, the corresponding second memory word may be written to memory element 246 as shown at 396.

Figure 7:
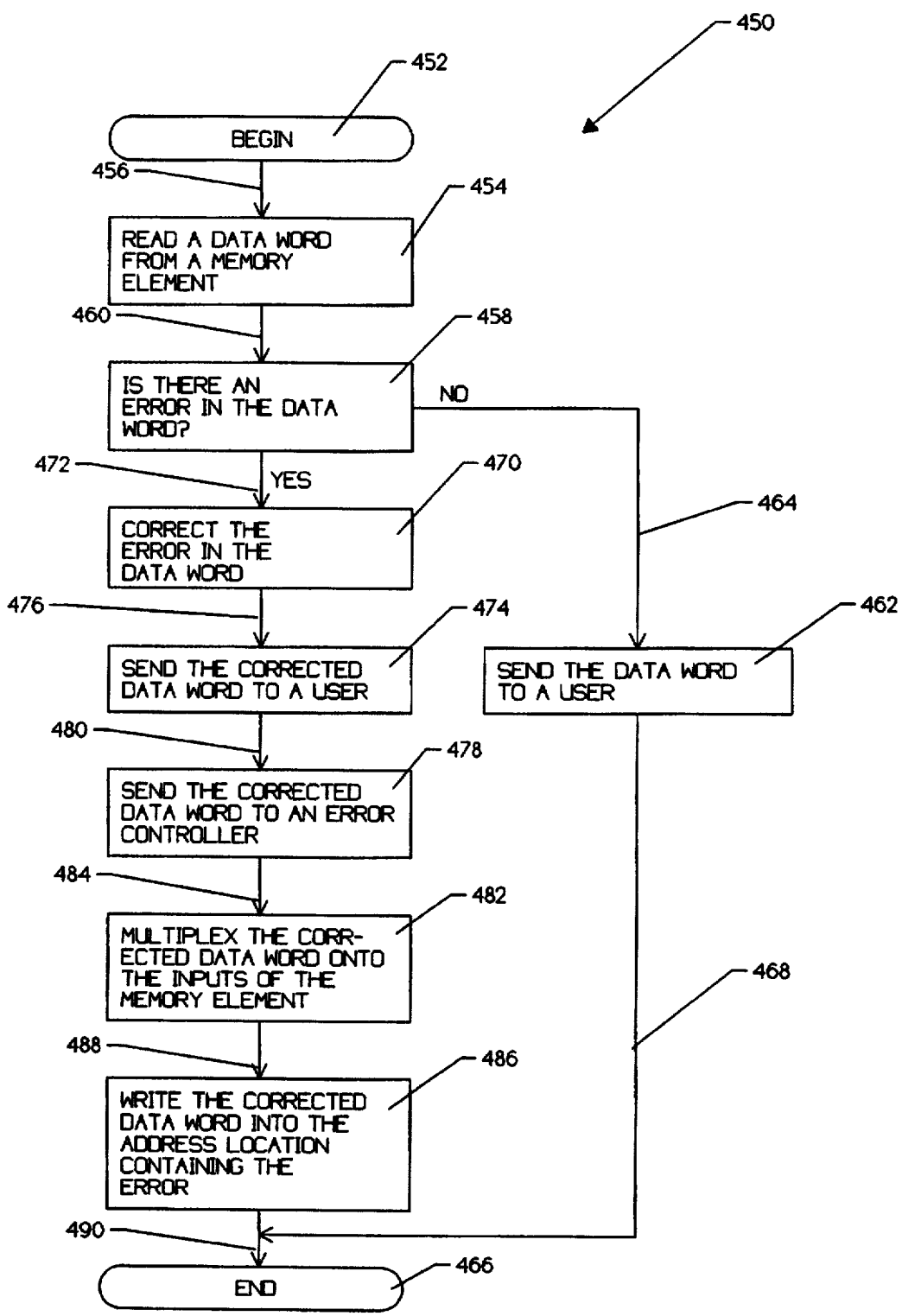
FIG. 7 is a flow diagram of a first method for removing soft errors from a memory element in accordance with the present invention.

FIG. 7 is a flow diagram of a first method for removing soft errors from a memory element in accordance with the present invention. The method is generally shown at 450 and entered at element 452. Control is passed to element 454 via interface 456. Element 454 reads a data word from a memory element. Control is passed to element 458 via interface 460. Element 458 determines whether there is an error in the data word. Although the exemplary embodiment detects single bit errors, it is contemplated that multiple bit errors may also be detected. If there is an error in the data word, control is passed to element 470 via interface 472. Element 470 corrects the error in the data word using standard error correction techniques. Control is then passed to element 474 via interface 476. Element 474 sends the corrected data word to a user. Control is then passed to element 478 via interface 480. Element 478 sends the corrected data word to an error controller element. Control is then passed to element 482 via interface 484. Element 482 multiplexes the corrected data word onto the inputs of the memory element. Control is then passed to element 486 via interface 488. Element 486 writes the corrected data word into the address location containing the error. Control is then passed to element 466 via interface 490 where the algorithm is exited.

Referring back to element 458, if a single bit error is not detected in the data word, control is passed to element 462 via interface 464. Element 462 sends the data word to a user and control is passed to element 466 via interface 468 where the algorithm is exited.

Figure 8:
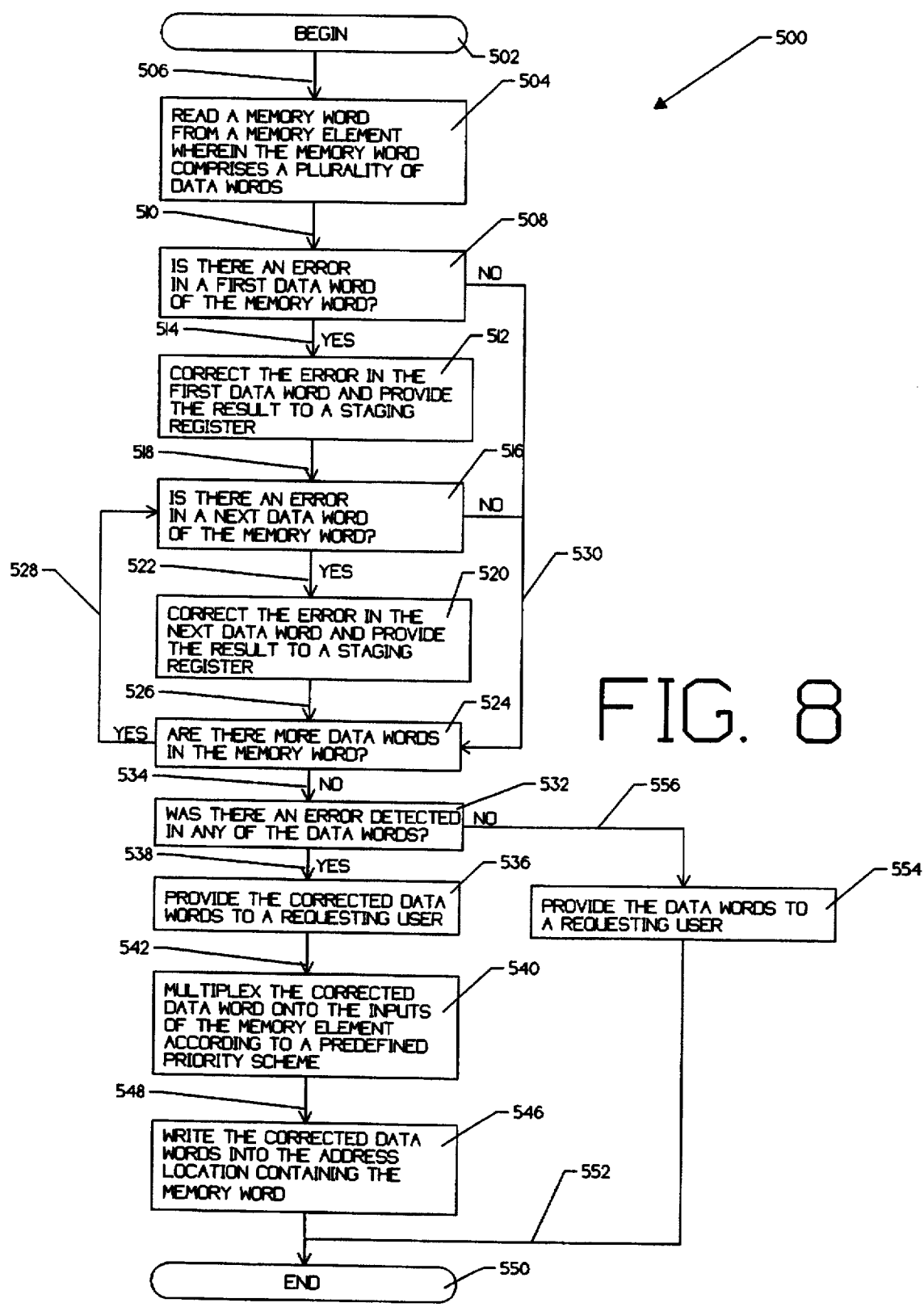
FIG. 8 is a flow diagram of a second method for removing soft errors from a memory element in accordance with the present invention.

FIG. 8 is a flow diagram of a second method for removing soft errors from a memory element in accordance with the present invention. The algorithm is shown generally at 500 and entered at element 502. Control is passed to element 504 via interface 506. Element 504 reads a memory word from a memory element, wherein the memory word comprises a plurality of data words. Control is passed to element 508 via interface 510. Element 508 determines whether there is an error in a first data word of the memory word. If there is an error in a first data word of the memory word, controlled is passed to element 512 via interface 514. Element 512 corrects the error in the first data word using standard error correction techniques. Control is then passed to element 516 via interface 518. Element 516 determines whether there is an error in the next data word of the memory word. If there is an error in the next data word of the memory word, control is passed to element 520 via interface 522. Element 520 corrects the error in the next data word using standard error correction techniques. Control is then passed to element 524 via interface 526. Element 524 determines whether there are any more data words in the memory word. If there are more data words in the memory word, control is passed back to element 516 via interface 528. The loop comprising elements 516, 520 and 524 is continued until all of the data word in the corresponding memory word have been processed.

Referring back to element 508, if there is not an error in the first data word of the memory word, control is passed to element 524 via interface 530. Similarly, referring back to element 516, if there is not an error in a next data word of the memory word, control is passed to element 524 via interface 530.

When the last data word of the memory word has been processed, control is passed from element 524 to element 532 via interface 534. Element 532 determines whether an error was detected in any of the data words of the memory word. If there was an error detected, control is passed to element 536 via interface 538. Element 536 provides the corrected data words to a requesting user. It is recognized that element 536 provides all of the data words of the memory word to a requesting user while substituting corrupted data words with corrected data words. Control is then passed to element 540 via interface 542. Element 540 multiplexes the corrected data words onto the inputs of the memory element according to a predefined priority scheme. Control is then passed to element 546 via interface 548. Element 548 writes the corrected data words into the address locations containing the memory word. Control is then passed to element 550 via interface 552, wherein the algorithm is exited.

Referring back to element 532, if none of the data words in the memory word had an error therein, control is passed to element 554 via interface 556. Element 554 provides the data words to a requesting user. Control is then passed to element via interface 552 wherein the algorithm is exited.

Having thus described the preferred embodiments in sufficient detail for those of skill in the art to make and use the present invention, those of skill in the art will be readily able to apply the teachings found herein to yet other embodiments within the scope of the claims hereto attached.

I claim:

1. A memory module for storing a plurality of memory words, the memory module being compatible with a system having a priority scheme, said memory module comprising:

a. a memory element for storing the plurality of memory words;
   b. writing means coupled to said memory element for writing predetermined ones of the plurality of memory words into the memory element during normal memory operation;
   c. reading means coupled to said memory element for reading predetermined ones of the plurality of memory words from said memory element;
   d. detecting means coupled to said reading means for detecting which of said predetermined ones of the plurality of memory words read from said memory element have an error therein;
   e. correcting means coupled to said detecting means and to said reading means for correcting said errors detected by said detecting means as the predetermined ones of the plurality of memory words are read from said memory element, thereby providing one or more corrected memory words;

f. providing means coupled to said correcting means and to said writing means for providing said one or more corrected memory words to said writing means wherein said writing means writes said one or more corrected memory words into the memory element; and g. interrupting means coupled to said providing means and to said writing means for interrupting normal memory operation thereby allowing said providing means to provide said one or more corrected memory words to said writing means.

2. A memory module according to claim 1 further comprising selecting means coupled to said writing means and to said providing means for selecting the plurality of memory words and providing the plurality of memory words to said writing means during normal memory operation, and for selecting said one or more corrected memory words and providing said one or more corrected memory words to said writing means when said normal memory operation is interrupted by said interrupting means.

3. A memory module according to claim 2 wherein said interrupting means interrupts said normal memory operation in accordance with a memory module priority scheme.

4. A memory module according to claim 3 wherein said memory module priority scheme is independent from the priority scheme of the system.

5. A memory module according to claim 4 wherein said providing means comprises dedicated hardware which is associated with the memory module.

6. A memory module according to claim 5 wherein said detecting means detects single bit errors.

7. A memory module according to claim 6 wherein said detecting means detects multiple bit errors.

8. A memory module according to claim 7 wherein said memory element comprises a DRAM.

9. A memory module for storing a plurality of memory words, the memory module being compatible with a system having a priority scheme, said memory module comprising:

a. a memory element for storing the plurality of memory words;

b. writing means coupled to said memory element for writing predetermined ones of the plurality of memory words into the memory element during normal memory operation;

c. reading means coupled to said memory element for reading predetermined ones of the plurality of memory words from said memory element;

d. detecting means coupled to said reading means for detecting which of said predetermined ones of the plurality of memory words read from said memory element have an error therein;

e. correcting means coupled to said detecting means and to said reading means for correcting said errors detected by said detecting means as the predetermined ones of the plurality of memory words are read from said memory element, thereby providing one or more corrected memory words;

f. staging means coupled to said correcting means for staging said one or more corrected memory words; and g. providing means coupled to said staging means and to said writing means for providing said one or more corrected memory words from said staging means to said writing means wherein said writing means writes said one or more corrected memory words into the memory element.

10. A memory module according to claim 9 further comprising interrupting means coupled to said providing means and to said writing means for interrupting normal memory operation thereby allowing said providing means to provide said one or more corrected memory words to said writing means.

11. A memory module according to claim 10 further comprising selecting means coupled to said writing means and to said providing means for selecting the plurality of memory words and providing the plurality of memory words to said writing means during normal memory operation, and for selecting said one or more corrected memory words and providing said one or more corrected memory words to said writing means when said normal memory operation is interrupted by said interrupting means.

12. A memory module according to claim 11 further comprising error correction code generation means coupled to said writing means for generating an error correction code for each of said predetermined ones of the plurality of memory words before said writing means writes said predetermined ones of the plurality of memory words to said memory element.

13. A memory module according to claim 12 wherein said error correction code generation means is further coupled to said providing means for generating an error correction code for each of said one or more corrected memory words before said writing means writes said one or more corrected memory words to said memory element.

14. A memory module according to claim 13 further comprising error correction code check means coupled to said reading means for regenerating an error correction code for each of said predetermined ones of the plurality of memory words as said predetermined ones of the plurality of memory words are read from said memory element.

15. A memory module according to claim 14 wherein said detecting means compares said error correction code generated by said error correction code generation means and said error correction code regenerated by said error correction code check means, said detecting means indicating an error if a predetermined relationship does not exist therebetween.

16. A memory module according to claim 15 wherein said detecting means utilizes said error correction code that is regenerated by said error correction code check means to determine which bits in a corresponding one of said predetermined ones of the plurality of memory words are in error.

17. A memory module according to claim 16 wherein said interrupting means interrupts said normal memory operation in accordance with a memory module priority scheme.

18. A memory module according to claim 17 wherein said memory module priority scheme is independent from the priority scheme of the system.

19. A memory module according to claim 18 wherein said providing means comprises dedicated hardware which is associated with the memory module.

20. A memory module according to claim 19 wherein each of said plurality of memory words comprises one or more data words.

21. A memory module according to claim 20 wherein said error correction code generation means generates an error correction code for each of said one or more data words in each of said plurality of memory words.

22. A memory module according to claim 21 wherein said error correction code check means regenerating an error correction code for each of said predetermined one or more data words in said predetermined ones of the plurality of memory words as said predetermined ones of the plurality of memory words are read from said memory element.

23. A memory module according to claim 22 wherein said staging means comprises at least one staging register.

24. A memory module according to claim 23 wherein said detecting means detects single bit errors.

25. A memory module according to claim 24 wherein said detecting means detects multiple bit errors.

26. A memory module according to claim 25 wherein said memory element comprises a DRAM.

27. A memory module for storing a plurality of memory words, the memory module being compatible with a system having a priority scheme, said memory module comprising:
 a. a memory element for storing the plurality of memory words;
 b. a writing circuit coupled to said memory element for writing predetermined ones of the plurality of memory words into the memory element during normal memory operation;
 c. a reading circuit coupled to said memory element for reading predetermined ones of the plurality of memory words from said memory element;
 d. a detecting circuit coupled to said reading circuit for detecting which of said predetermined ones of the plurality of memory words read from said memory element have an error therein;
 e. a correcting circuit coupled to said detecting circuit and to said reading circuit for correcting said errors detected by said detecting circuit as the predetermined ones of the plurality of memory words are read from said memory element, thereby providing one or more corrected memory words;
 f. a providing circuit coupled to said correcting circuit and to said writing circuit for providing said one or more corrected memory words to said writing circuit wherein said writing circuit writes said one or more corrected memory words into the memory element and;
 g. an interrupting circuit coupled to said providing circuit and to said writing circuit for interrupting normal memory operation thereby allowing said providing circuit to provide said one or more corrected memory words to said writing circuit.

28. A memory module according to claim 27 further comprising a multiplexer coupled to said writing circuit and to said providing circuit for selecting the plurality of memory words and providing the plurality of memory words to said writing circuit during normal memory operation, and for selecting said one or more corrected memory words and providing said one or more corrected memory words to said writing circuit when said normal memory operation is interrupted by said interrupting circuit.

29. A memory module according to claim 28 wherein said interrupting circuit interrupts said normal memory operation in accordance with a memory module priority scheme.

30. A memory module according to claim 29 wherein said memory module priority scheme is independent from the priority scheme of the system.

31. A memory module according to claim 30 wherein said providing circuit comprises dedicated hardware which is associated with the memory module.

32. A memory module according to claim 31 wherein said detecting circuit detects single bit errors.

33. A memory module according to claim 32 wherein said detecting circuit detects multiple bit errors.

34. A memory module according to claim 33 wherein said memory element comprises a DRAM.

35. A memory module for storing a plurality of memory words, the memory module being compatible with a system having a priority scheme, said memory module comprising:
 a. a memory element for storing the plurality of memory words;
 b. a writing circuit coupled to said memory element for writing predetermined ones of the plurality of memory words into the memory element during normal memory operation;
 c. a reading circuit coupled to said memory element for reading predetermined ones of the plurality of memory words from said memory element;
 d. a detecting circuit coupled to said reading circuit for detecting which of said predetermined ones of the plurality of memory words read from said memory element have an error therein;
 e. a correcting circuit coupled to said detecting circuit and to said reading circuit for correcting said errors detected by said detecting circuit as the predetermined ones of the plurality of memory words are read from said memory element, thereby providing one or more corrected memory words;
 f. a staging circuit coupled to said correcting circuit for staging said one or more corrected memory words; and
 g. a providing circuit coupled to said staging circuit and to said writing circuit for providing said one or more corrected memory words from said staging circuit to said writing circuit wherein said writing circuit writes said one or more corrected memory words into the memory element.

36. A memory module according to claim 35 further comprising an interrupting circuit coupled to said providing circuit and to said writing circuit for interrupting normal memory operation thereby allowing said providing circuit to provide said one or more corrected memory words to said writing circuit.

37. A memory module according to claim 36 further comprising a multiplexer circuit coupled to said writing circuit and to said providing circuit for selecting the plurality of memory words and providing the plurality of memory words to said writing circuit during normal memory operation, and for selecting said one or more corrected memory words and providing said one or more corrected memory words to said writing circuit when said normal memory operation is interrupted by said interrupting circuit.

38. A memory module according to claim 37 further comprising an error correction code generation circuit coupled to said writing circuit for generating an error correction code for each of said predetermined ones of the plurality of memory words before said writing circuit writes said predetermined ones of the plurality of memory words to said memory element.

39. A memory module according to claim 38 wherein said error correction code generation circuit is further coupled to said providing circuit for generating an error correction code for each of said one or more corrected memory words before said writing circuit writes said one or more corrected memory words to said memory element.

40. A memory module according to claim 39 further comprising an error correction code check circuit coupled to said reading circuit for regenerating an error correction code for each of said predetermined ones of the plurality of memory words as said predetermined ones of the plurality of memory words are read from said memory element.

41. A memory module according to claim 40 wherein said detecting circuit compares said error correction code generated by said error correction code generation circuit and said error correction code regenerated by said error correction code check circuit, said detecting circuit indicating an error if a predetermined relationship does not exist therebetween.

42. A memory module according to claim 41 wherein said detecting circuit utilizes said error correction code that is regenerated by said error correction code check circuit to determine which bits in a corresponding one of said predetermined ones of the plurality of memory words are in error.

43. A memory module according to claim 42 wherein said interrupting circuit interrupts said normal memory operation in accordance with a memory module priority scheme.

44. A memory module according to claim 43 wherein said memory module priority scheme is independent from the priority scheme of the system.

45. A memory module according to claim 44 wherein said providing circuit comprises dedicated hardware which is associated with the memory module.

46. A memory module according to claim 45 wherein each of said plurality of memory words comprises one or more data words.

47. A memory module according to claim 46 wherein said error correction code generation circuit generates an error correction code for each of said one or more data words in each of said plurality of memory words.

48. A memory module according to claim 47 wherein said error correction code check circuit regenerating an error correction code for each of said predetermined one or more data words in said predetermined ones of the plurality of memory words as said predetermined ones of the plurality of memory words are read from said memory element.

49. A memory module according to claim 48 wherein said staging circuit comprises at least one staging register.

50. A memory module according to claim 49 wherein said detecting circuit detects single bit errors.

51. A memory module according to claim 50 wherein said detecting circuit detects multiple bit errors.

52. A memory module according to claim 51 wherein said memory element comprises a DRAM.

* * * * *